United States Patent [19]

Fillmore et al.

[11] 4,417,256
[45] Nov. 22, 1983

[54] BREAK-OFF UNIFORMITY MAINTENANCE

[75] Inventors: Gary L. Fillmore; Van C. Martin, both of Boulder; Gregory L. Ream, Longmont, all of Colo.

[73] Assignee: International Business Machines Corporation, Armonk, N.Y.

[21] Appl. No.: 360,280

[22] Filed: Mar. 22, 1982

Related U.S. Application Data

[63] Continuation of Ser. No. 148,472, May 9, 1980, abandoned.

[51] Int. Cl.³ ............................................. G01D 18/00
[52] U.S. Cl. ........................................ 346/75; 346/1.1
[58] Field of Search ........................................ 346/75

[56] References Cited

U.S. PATENT DOCUMENTS

| | | | |
|---|---|---|---|
| 3,562,761 | 2/1971 | Stone | 346/75 |
| 3,750,191 | 7/1973 | Naylor | 346/75 |
| 3,761,941 | 9/1973 | Robertson | 346/75 X |
| 3,787,882 | 1/1974 | Fillmore | 346/75 |
| 3,836,912 | 9/1974 | Ghougasian | 346/75 |
| 3,852,768 | 12/1974 | Carmichael | 346/75 |
| 3,969,733 | 7/1976 | De Moss | 346/75 X |
| 3,977,010 | 8/1976 | Erickson | 346/75 |
| 4,016,571 | 4/1977 | Yamada | 346/75 |
| 4,045,770 | 8/1977 | Arnold | 346/75 |
| 4,047,183 | 9/1977 | Taub | 346/75 X |
| 4,129,875 | 12/1978 | Ito | 346/75 |

OTHER PUBLICATIONS

Ream, G. L.; Satellite Drop Detector; IBM TDB, vol. 22, No. 7, Dec. 1979, pp. 2666-2668.

*Primary Examiner*—Joseph W. Hartary
*Attorney, Agent, or Firm*—Homer L. Knearl; Joscelyn G. Cockburn

[57] ABSTRACT

In a multinozzle ink jet printing system, a closed loop servo system drives the drop generator so that the distance between the streams at which ink droplets are detached is maintained at an optimum range. One or more sensors are positioned downstream from the multinozzle plate of the ink jet printing system. The sensors sense the flight time of ink droplets and output signals which are developed into a variable voltage for controlling the drop generator.

11 Claims, 10 Drawing Figures

BREAK-OFF UNIFORMITY MAINTENANCE

This is a continuation of application Ser. No. 148,472 filed May 9, 1980 now abandoned.

BACKGROUND OF THE INVENTION (1) Field of the Invention

The present invention relates, in general, to ink jet printers. More particularly, the present invention relates to multinozzle ink jet printers wherein a characteristic of the print head is controlled so that the quality of prints generated from the head is optimized.

(2) Prior Art

The use of ink jet printers for printing data and other information on a strip of recording media is well known in the prior art. One type of conventional ink jet printer incorporates a plurality of electrical components and fluidic components. The components coact to enable the printing function. The fluidic components include a print head having a chamber for storing a printing fluid or ink and a nozzle plate with one or more ink nozzles interconnected to the chamber. A gutter assembly is positioned downstream from the nozzle plate in the flight path of ink droplets. The gutter assembly catches ink droplets which are not needed for printing on the recording medium.

In order to create the ink droplets, a drop generator is associated with the print head. The drop generator produces a perturbation at a frequency which forces thread-like streams of ink, which are initially ejected from the nozzles, under pressure to be broken up into a series of ink droplets at a point (called the break-off point) within the vicinity of the nozzle plate.

A charge electrode is positioned along the flight path of the ink droplets. Preferably, the charge electrode is positioned at the break-off point of the ink droplets. The function of the charge electrode is to selectively charge the ink droplets as said droplets break off in proximity to said electrodes. A pair of deflection plates is positioned downstream from the charge electrodes. The function of the deflection plates is to deflect a charged ink droplet either into the gutter or onto the recording media.

Another type of conventional ink jet printer incorporates a plurality of magnetic components and fluidic components. The fluidic components are substantially equivalent to the fluidic components previously described. However, the electrical components are replaced with magnetic components for influencing the direction of travel of the droplet streams. This type of ink jet printer is well known in the prior art and, therefore, the details will not be described.

One of the problems associated with ink jet printers of the aforementioned types, is the generation of "satellite droplets." The satellite droplets are usually smaller in size than the droplets used for printing (hereinafter called print droplets) and are usually interspersed therewith. Although the print droplets can be controlled electrically or magnetically so as to reproduce copies with acceptable print quality, it is extremely difficult, if not impossible, to control the satellite droplets.

In the first instance, the satellite droplets tend to merge with the print droplets. The newly formed droplets (that is the print droplets plus the satellite droplets) usually have different charge to mass ratios. Also, the newly formed droplets (hereinafter called merged droplets) tend to travel at a different velocity than the normal print droplets. As was stated previously, printing is done by the droplets propelled in a controlled manner to impinge on the support medium. When a mixture of merged droplets and normal print droplets are propelled towards the support medium, the nonuniform properties of the droplets cause inaccurate placement of the droplets on the recording media. This inaccurate drop placement results in poor print quality.

Even when the satellite droplets do not merge with the print droplets, they tend to assume an independent flight path. The alternate result is that the satellite droplets either impinge the recording medium randomly (that is at the wrong position) or impinge the components positioned around the flight path of the droplets. Where the satellite droplets impact the recording media at the wrong position, the print quality is poor. Similarly, where the satellite droplets impinge on the components, the reliability of the ink jet print system is reduced since the droplets wet the electrical components resulting in an electrical short circuit.

SUMMARY OF THE INVENTION

It is therefore the main object of the present invention to control an ink jet printing system to assure operation in a "print window" free from satellite droplets.

In the present invention the ideal "print window" is maintained by implementing a close-loop servo system for driving the drop generator. The drop generator vibrates the print head and/or ink to generate a series of droplets from the capillary streams. The close-loop servo includes a drop charge sensor for periodically outputting a control signal. An electrical circuit uses the control signal to generate time of flight information for the charge droplets, and a controller generates a plurality of voltages for driving the drop generator.

More particularly, a sensor means for sensing an electrical charge on the droplets is positioned downstream from the charge electrode. As droplets are detached from their associated capillary streams, a charge is placed on the droplets. An electrical signal is generated or induced as the charged droplet passes over the sensing means. The signal is processed by a circuit means to generate a time-of-flight signal. The time-of-flight signal is the time necessary for a charged drop to travel from the point where it detaches from the capillary stream until it is sensed by the sensing means. A controller processes the time-of-flight signal to determine the weakest driven stream and the strongest driven stream. A variable voltage is then generated to drive the drop generator until the time of flight for the weakest driven stream and the strongest driven stream is identical. The voltage at which the equality occurs is the optimum voltage for driving the system.

In one feature of the invention, the controller outputs a variable controlled word. The variable controlled word and a fixed reference voltage is fed into a multiplying digital-to-analog converter (DAC). The output from the DAC is used to drive the drop generator.

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

Figure 1:
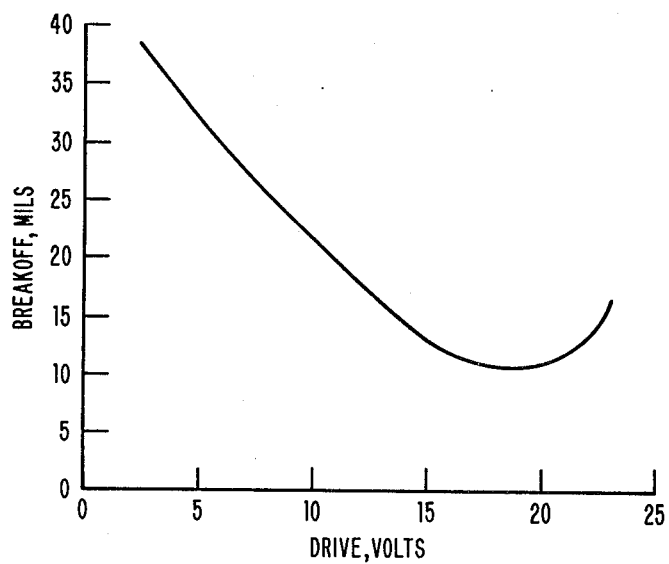
FIG. 1 shows a schematic which represents the interrelation between the drop generator drive voltage and the distance (references from the nozzle plate) at which a droplet detaches from a capillary stream. The showing is for a single nozzle head.

Turning now to the drawings, FIG. 1 shows a typical plot of break-off distance versus the voltage placed on the drop generator. As is used in this application, the term "break-off distance" is defined as the distance between the exit from the nozzle plate and the point at which droplets detach from the capillary streams emitting from said nozzle plate. As is shown in the drawing, this distance is strongly affected by the perturbation placed on the capillary streams by the drop generator. As the driving voltage increases, the break-off distance decreases to a minimal point. In FIG. 1, the minimal point is within the vicinity of ten mils. This minimum will vary depending on several characteristics of the ink jet printer such as ink properties, head properties, etc. Any increase in drive voltage beyond the minimal break-off voltage, will result in an increase in the break-off distance. Stated another way, if one drives the drop generator with a voltage greater than the voltage which generates the minimum break-off distance, the break-off distance will begin to increase. It has been determined by empirical means that it is most advantageous to drive the drop generator with a voltage which forced break-off to occur at the minimum distance from the nozzle plate. When an ink jet head is operated at this point, the creation and effect of satellite droplets are significantly reduced if not eliminated. The plot in FIG. 1 is primarily directed at a single nozzle head.

Figure 2:
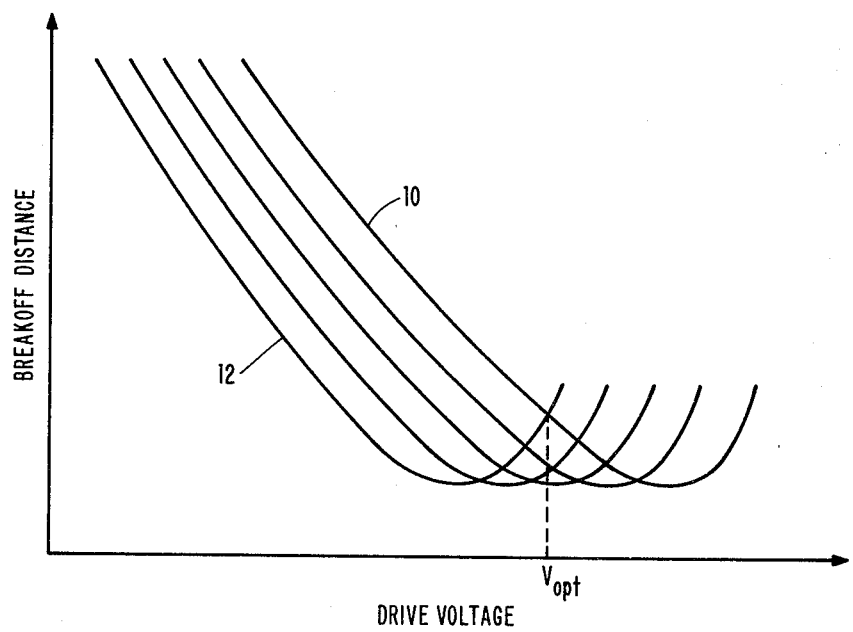
FIG. 2 is a schematic showing the relation between drop generator drive voltage and break-off distance for a multinozzle head. The showing is helpful in understanding the present invention.

For a multinozzle head (that is a head having a plurality of droplet streams), operation at the minimum break-off point is equally important. However, this goal is often elusive primarily because in a multinozzle head, the perturbation along the longitudinal axis of the array is nonuniform. Due to the nonuniform perturbation, each stream will reach its minima at a slightly different drive voltage. This effect is shown in FIG. 2. Each curve in FIG. 2 represents a stream in a multinozzle head. As such, FIG. 2 represents a multinozzle head having five capillary streams. It should be noted at this point, that the number of streams are merely representative and should not be used to limit the scope of the present invention. As is shown in FIG. 2, stream 10 represents the weakest driven stream while stream 12 represents the strongest driven stream. As was stated previously, the goal is to operate the head in a satellite-free region. The satellite-free region occurs where the streams are detaching at the minimum distance from the nozzle plate, hereinafter called the minimum break-off point. Since the streams are breaking off at different points in a multinozzle head, the best or optimum operating point for the multinozzle ink jet system is the point where the variation or spread in break-off distance between the streams is at a minimum. This operating point occurs where the curves for the weakest driven stream 10 and the strongest driven stream 12 intersect. The optimum voltage which assures that the streams will be breaking off at this point is identified in FIG. 2 as $V_{opt}$. The break-off distance of all streams is now contained between the minimum break-off and break-off of the strongest/weakest driven stream. By means of a servo-controlled loop, to be fully described hereinafter, the present invention determines $V_{opt}$ and strives to maintain operation of the system at this point.

Figure 3:
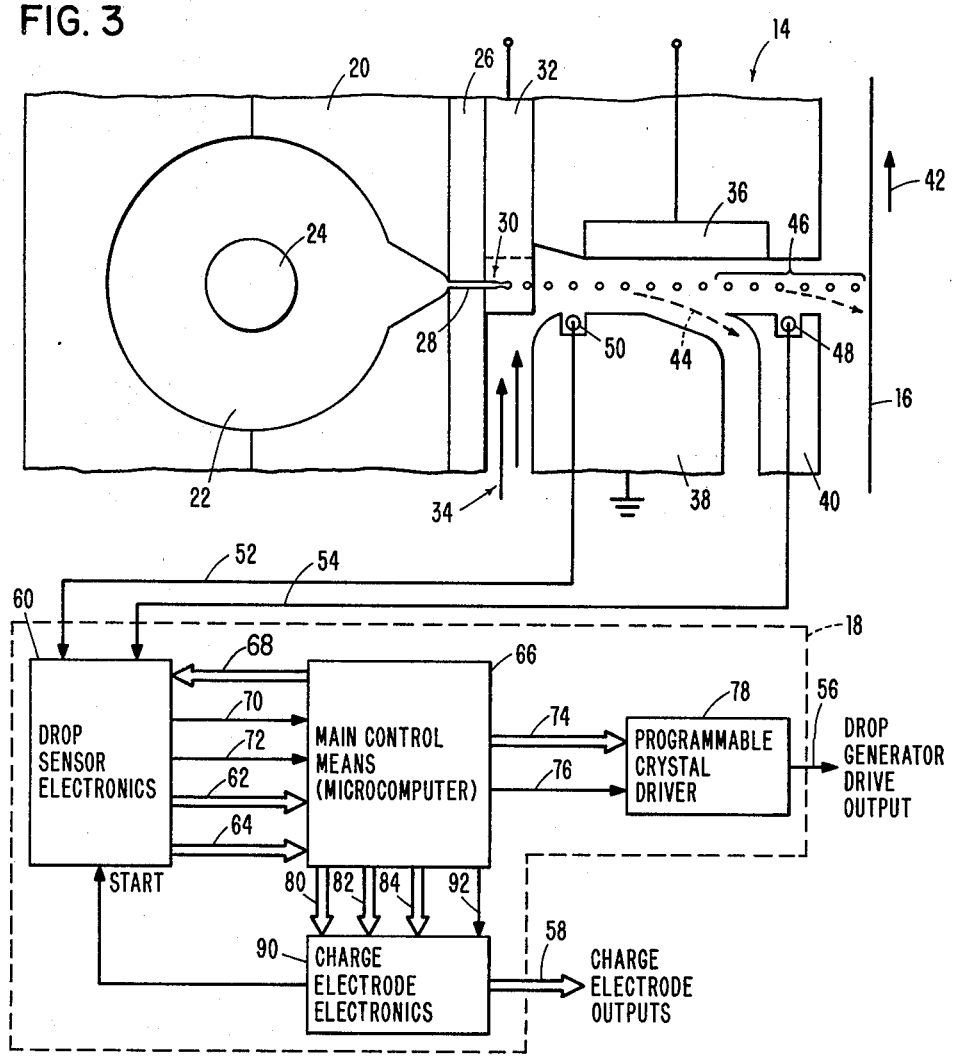
FIG. 3 shows a schematic of a servo-controlled ink jet printer embodying the teachings of the present invention.

Referring now to FIG. 3, a block diagram of an ink jet printing system embodying the teaching of the present invention is shown. The ink jet printing system is controlled so that the break-off distance between the capillary streams are maintained within a minimum range. The ink jet printing system includes a print assembly 14, a support media 16 and a controller assembly 18. The function of the print assembly 14 is to generate droplet streams which print data onto the support media 16. The print assembly 14 includes a head body 20. The head body may be of any desired geometry such as rectangular, circular, etc. The head body is fitted with a fluid cavity 22. The fluid cavity is supplied with a pressurized print fluid such as an electrically conductive ink. A disturbance means 24 is placed within the conductive fluid. In the preferred embodiment of this invention, the disturbance means is a piezoelectric crystal. A nozzle plate 26 is firmly attached to head body 20. The nozzle plate is fabricated with a plurality of orifices, only one of which is shown in FIG. 3 and identified as 28. The nozzle orifice interconnects the fluid cavity with the face of the nozzle plate. The pressurized print fluid previously mentioned, is extruded as a thread-like or capillary stream from the nozzle orifice. Element 30 (FIG. 3) represents one of the capillary streams of print fluid. When an appropriate drive voltage is applied to the disturbance means 24, a pressure front is developed in the print fluid. The pressure front extends in a direction perpendicular to the orifices in the nozzle plate. As a result, the thread-like or capillary stream of print fluid 30 is broken up into a series of droplets at a point downstream from the nozzle plate. The point at which the droplets are detached is referred to in this specification as the break-off point. It is worthwhile noting at this point, that although the drawing in FIG. 3 shows only a single stream emanating from the nozzle plate, the invention contemplates a system having a plurality of such streams. In such a multistream system, the individual streams are arranged in spaced relation along a line extending perpendicular to the page.

Still referring to FIG. 3, downstream from the nozzle plate at the break-off point, a charge electrode assembly 32 is positioned. The function of the charge electrode assembly 32 is to charge or not charge individual droplet streams as they break off from the capillary streams. It is worthwhile noting that the charge electrode assembly includes sufficient charge electrodes for charging each stream individually. The print assembly may be fitted with an airflow tunnel 34. The airflow tunnel 34 supplies air to flow collinearly with the droplets from an air supply means (not shown). Positioned downstream from the charge electrode assembly is a deflection electrode means. The deflection electrode means includes an upper deflection plate 36 and a lower deflection plate 38. Either the upper deflection plate 36 or the lower deflection plate 38 can be maintained at a positive potential while the other deflection plate is maintained at a negative or ground potential. In the preferred embodiment of this invention, the upper deflection plate 36 is maintained at a negative potential while the lower deflection plate is maintained at a zero or ground potential. Downstream from the deflection plate means is a gutter assembly 40. The gutter assembly 40 catches droplets of print fluid which are not needed for printing on the support media 16. In the preferred embodiment of this invention, the support media is paper and travels in the direction shown by arrow 42 at a predetermined velocity. When a droplet is charged, the charged droplet is deflected into gutter assembly 40 along no-print flight path 44. Similarly, an uncharged droplet travels along print path 46 for printing on the paper.

Still referring to FIG. 3, a sensor means 48 is mounted within grounded gutter assembly 40. The sensor means is mounted so that it runs orthogonal to the droplet streams. The function of the sensor means 48, hereinafter called drop charge sensor, is to generate a current signal waveform when charge droplets pass within its vicinity. It is worthwhile noting that the drop charge sensor 48 need not be placed within the gutter assembly. However, by placing the drop charge sensor within the grounded gutter assembly, it is electrically shielded from electrical noise. As will be explained subsequently, the current signal developed in drop charge sensor 48 is processed by controller assembly 18 to generate the charging phase for the streams and for measuring the time of flight (TOF) of the droplets (from the break-off to the drop charge sensor 48). The time of flight is used to monitor relative break-off time (distance) to control the piezoelectric crystal drive amplitude so that the spread of break-off times (distances) between streams are minimized. Although a plurality of sensing means can be used for drop charge sensor 48, in the preferred embodiment of this invention the drop charge sensor is a single conductor. As charge droplets pass over the wire, a current is induced therein. A more detailed description of an inductive type sensor which may be used in this invention, is described in U.S. Pat. No. 3,977,010.

Although a single drop charge sensor 48 can be used to measure the passage of charge droplets, in an alternate embodiment of the invention, a second drop charge sensor 50 is positioned in the lower deflection plate. The drop charge sensor 50 is also positioned orthogonal to the plurality of droplet streams. The characteristic, function and construction of drop charge sensor 50 is identical to that of drop charge sensor 48 and, therefore, will not be described any further. Suffice it to say that by utilizing a second drop charge sensor positioned in spaced relationship, the velocity and/or the flight time of a droplet can be determined more accurately. Moreover, if the second sensor is located relatively close to the point of break-off, a more accurate determination of absolute break-off distance and relative break-off difference streams is possible.

Still referring to FIG. 3, the signal outputted from drop charge sensors 48 and 50 are fed over conductor 54 and 52 respectively, into control assembly 18. The control assembly processes an output control signal on conductors 56 and 58, respectively. The control signal on conductor 56 is used to servo control the disturbance means 24. The disturbance means 24 is sometimes referred to as the drop generator. Similarly, the control signals on terminals 58 are used for driving the charge electrode assembly 32.

The control assembly 18 includes drop sensor electronics means 60. The drop sensor electronic means 60 receives feedback signals from conductor 54 and/or conductor 52 and generates drop arrival time signals and amplitude signals. Both sets of signals (that is the amplitude signal and the drop arrival time signal) are fed over multiplexor buses 62 and 64 respectively, into a main control means 66. Although the main control means 66 can be fabricated from discrete logic and/or circuit components, in the preferred embodiment of this invention the main control means 66 is a conventional microcomputer. The microcomputer outputs control signals such as gain control signals over multiplexor bus 68 to drive the drop sensor electronic means 60. Similarly, status information is transmitted over simplex bus 70 and simplex bus 72 to the microcomputer. The microcomputer outputs a controlled word over multiplexor bus 74 and an enabling signal over simplex bus 76. The signal on simplex bus 76 enables the programmable crystal driver means 78. The control word on multiplexor bus 74 is utilized by the programmable crystal driver means 78 to control the amplitude of the signal supply to the drop charge generator. Detailed description of the circuit comprising the drop charge sensor electronics means 60 and the programmable crystal driver means 78 will be described shortly.

The microprocessor also generates control signals for phasing break-off. Phasing is the process by which droplets detaching from the capillary streams are supplied with a charge pulse. Ideally, the phase or relationship between the charging pulse and the break-off is such that the drop break-off time is positioned within the mid-point of the charging pulse. By so doing, a maximum charge is supplied to the droplets. To this end, a plurality of controlled signals are generated by the microcomputer and supplied over multiplexor buses 80, 82 and 84 respectively, to the charge electrodes' electronics driver means 90. By way of example, mode information, drop count information, stream select information, etc., are some of the control data that is generated by the microprocessor and transmits over the multiplexor buses to the charge electrode driver means 90. Enabling or initiating operation of the charge electrode driver means is started by an enabling signal over simplex bus 92. Since the procedure of phasing is well known in the prior art and does not form part of the present invention, detailed description of the operation of the phasing associated with the main control means 66 will not be described. Suffice it to say that the charge electrode driver means 90 includes a charge electrode waveform generator and individual driver circuits for driving the individual charge electrodes located in charge electrode assembly 32. A more detailed description of phasing is given in IBM Technical Disclosure Bulletin, Vol. 22, No. 7, December 1979, Page 2666.

Figure 4:
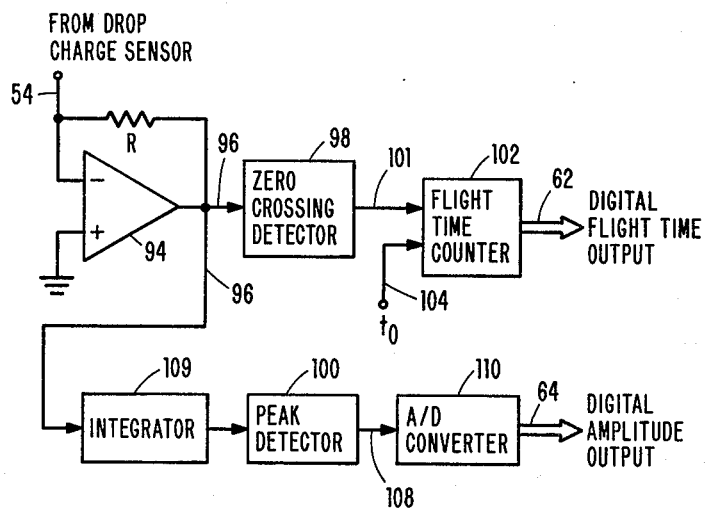
FIG. 4 shows, in block diagram form, the details of an electronic circuit for measurement time of flight.

Referring now to FIG. 4, a detailed circuit of the drop sensor electronic means 60 (FIG. 3) is shown. As was stated previously, a charged droplet or group of droplets traversing over drop charge sensor 48 induces a current waveform therein. It should be noted that if one elects to use both drop charge sensor 50 and 48, respectively, to measure time of flight of charge droplets, then a circuit identical to that shown in FIG. 4 would be designed to process the signal generated in wire 50 (FIG. 3). Since both circuits would be identical, only one of these circuits, and in particular, the circuit associated with drop charge sensor 48, will be described in detail. As a charged drop or group of drops pass over drop sensor 48, a current is induced in the wire. A signal indicative of the current waveform is outputted on conductor 54. The signal on conductor 54 is fed into a transimpedance operational amplifier means 94. The operational amplifier means 94 includes a two-input operational amplifier with its output interconnected to the negative input by a feedback loop. A resistor (R) is placed within the feedback loop to control the gain of the amplifier. The signal received on conductor 54 is amplified and outputted on conductor 96. From conductor 96 the signal is fed into zero-crossing detector 98 and peak detector 100. The zero-crossing detector network 98 is a conventional network which outputs a signal ($t_s$) on conductor 101 when a sinusoidal signal is changing from positive to negative or vice versa. The signal $t_s$ on conductor 101 disables (that is stops) flight time counter 102. Likewise, enabling (that is starting) the flight time counter to count is achieved by a controlled signal ($t_0$) on conductor 104. The count which is trapped in the flight time counter 102 signifies the time of flight for a droplet from break-off point until it is sensed by the sensor postioned downstream. The count is outputted on multiplexor bus 62 is microcomputer 66 (FIG. 3).

Figure 6:
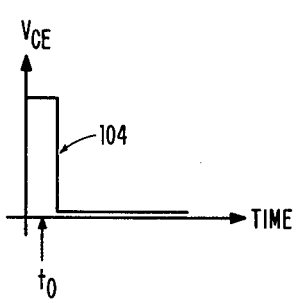
FIG. 6 shows a graphical representation of the charging voltage for a droplet.
Figure 7:
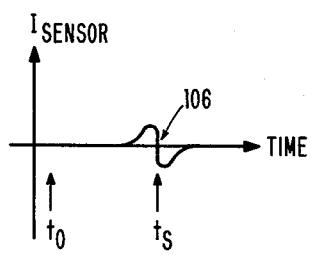
FIG. 7 shows a graphical representation of a current waveform induced in a drop sensor wire.

Turning for the moment to FIGS. 6 and 7, a graphical representation of a charge electrode voltage 104 and an induced current 106 is shown. At time $t_0$ as a droplet is detached from the capillary streams 30, FIG. 3, a charging pulse 104 is applied to the charge electrode. Simultaneously, a control pulse is generated by the microcomputer and is applied to the counter 102 over conductor 103. At some later time, $t_s$ the charge droplets now induce the current waveform 106 in drop sensor 48 (FIG. 3). When the droplet is positioned directly over the drop charge sensor, the zero-crossing detector will output a pulse on conductor 101 (FIG. 4). That pulse is used to stop the time-of-flight counter from counting. As such, $t_0$ enables the counter 102 while $t_s$ stops the counter. The trapped count signifies the time-of-flight for a particular droplet or group of droplets.

Returning now to FIG. 4, the signal which is outputted on conductor 96 is fed into integrator 109. The output of the integrator is fed into peak detector 100. The peak detector is a conventional peak detector and detects the maximum amplitude of the integrated current. The amplitude signal is fed over conductor 108 into analog-to-digital converter 110. The output from the analog-to-digital converter 110 is fed over multiplexor bus 64 into the microcomputer. The microcomputer uses the digital amplitude signal for phasing the ink jet printing system.

Figure 5:
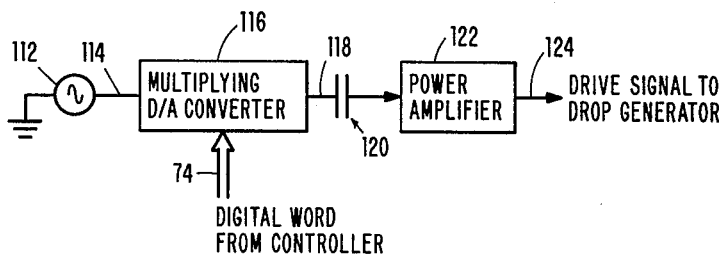
FIG. 5 shows, in block diagram form, the details of an electronic circuit which generates a variable voltage for driving the drop generator.

Referring now to FIG. 5, a block diagram for the details of the programmable crystal driver means 78 (FIG. 3) is shown. The function of the programmable crystal driver means 78 is to dynamically adjust the voltage driving the piezoelectric crystal 24 (FIG. 3) until $V_{opt}$ (FIG. 2) is obtained wherein all the streams emanating from the nozzle plate are breaking off within a minimum range. The programmable crystal driver means includes a fixed signal source 112. In the preferred embodiment of this invention, the signal source 112 is a free-running oscillator which generates a signal at a fixed drop clock frequency and having a fixed amplitude. The signal is fed over conductor 114 into a conventional multiplying digital-to-analog converter 116. The multiplying digital-to-analog (D/A) converter 116 is fitted with a digital multiplexor input. Multiplexor bus 74 is connected to the multiplexor input. The variable digital control word which is outputted from the microcomputer, is fed over multiplexor bus 74 into the D/A converter. The multiplying converter combines the fixed signal outputted on conductor 114 with the variable control word outputted from the digital computer to generate a variable voltage which is outputted on conductor 118. The signal on conductor 118 is coupled through a coupling capacitor 120 into power amplifier 122. The power amplifier amplifies the signal and outputs the amplified signal on conductor 124 which transmits said signal to drive the drop generator. In the preferred embodiment of this invention, the multiplying D/A converter multiplies the variable signal on multiplexor bus 74 with the fixed sigal on conductor 114.

As was stated previously, the main control means 66 (FIG. 3) is a conventional microcomputer. Any type of conventional microcomputer can be utilized. By way of example, the M6800 microcomputer, manufactured by Motorola Semiconductor, Inc. is a suitable microcomputer. This microcomputer has its given instruction sets, which can be utilized by one having ordinary skill in the art of programming, to generate a machine program in accordance with a series of process steps to be given hereinafter. The M6800 includes a microprocessor module coupled to adequate storage. Since this microprocessor is well known in the art, details of its operation, etc. will not be given hereinafter.

Having described the apparatus for driving the drop generator, the process steps or method in which the apparatus is used to determine the optimum voltage ($V_{opt}$) will now be described. A broad description of the process steps is followed by a detailed description aided by a flowchart. As was stated previously, the optimum operating point of the system, be it a single nozzle or multinozzle ink jet printer, is within the vicinity of minimum break-off distance. For a single nozzle stream, the minimum break-off distance is determined and the voltage which is associated with that minimum break-off is maintained as the optimum voltage for driving the drop generator. In a multinozzle head, the weakest driven stream is determined and the strongest driven stream is determined. In order to determine the weakest driven stream and the strongest driven stream, the following procedure is followed:

STEP 1

For each stream in the multiple array, a relatively low drive voltage (say between six and ten volts) is applied to the drop generator. As a drop is detaching from the stream, a voltage is applied to the charge electrode.

STEP 2

At a point downstream from the break-off point, the drop sensor and associated electronic circuit measure the time of flight of the droplet. This time of flight is recorded.

STEP 3

The recorded flight times are investigated. The jet having the longest flight time is the strongest driven jet while the jet having the shortest flight time is the weakest driven jet.

STEP 4

The drive to the drop generator is increased and the flight time for each jet (that is the strongest driven jet and the weakest driven jet) is monitored. The process of increasing the drive voltage is continued until the two flight times are identical. When the flight time is identical, the corresponding voltage is the optimum voltage ($V_{opt}$, see FIG. 2) for driving the system.

Assuming that the spread in break-off distance is less than one wavelength, another method which can be used to determine the break-off position of the stream is the so-called phasing method. With the phasing method, the phasing characteristics of the streams are used to determine the optimum drop generator drive voltage ($V_{opt}$). In the phasing method, the period of the clock which is used for driving the drop generator is divided into a plurality of intervals, say N. During each of the N intervals, in turn, a signal is applied to the charge electrode of the lightest driven stream. The sensor senses whether or not a drop is charged. The procedure is continued until all N intervals have been tried.

One or more of the charging signals will result in a charged drop. The center of the packet of intervals which produces the charged drops is defined as the break-off for the stream. The process or procedure is repeated for the strongest driven stream. The drive voltage to the crystal drive is adjusted until the break-off phase for the two streams are identical. This voltage which creates the common break-off phase is the optimum drive voltage.

Figure 8:
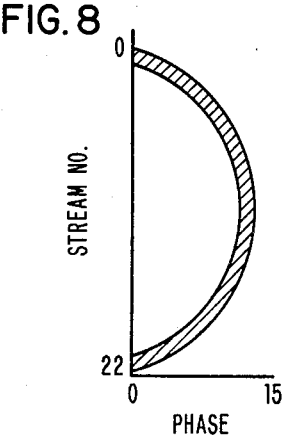
FIG. 8 shows a plot of phase versus stream number for an overdriven print head.
Figure 9:
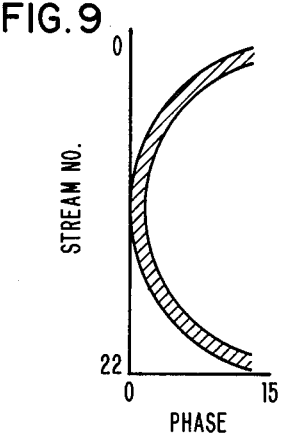
FIG. 9 shows a graphical representation of an underdriven print head.

Yet another characteristic of the streams which can be measured to identify the minimum break-off spread and hence the optimum operating voltage ($V_{opt}$) is the break-off shape analysis method. In this method, the bowing of the break-off curve for all streams as the drop generator drive voltage changes, is used to determine whether the drive voltage should be increased or decreased and the optimum voltage ($V_{opt}$) for driving the drop generator. FIGS. 8 and 9 show a graphical representation of the bowing characteristics. In the figures, the charging phases are plotted against the stream numbers. The curve is obtained by noting the phase at which each stream is broken up into droplets and charged for a specific drive voltage. The convex curve in FIG. 8 represents an overdriven head while the concave curve of FIG. 9 represents an underdriven head. In operation, the controller records the phase and stream information. By interrogating the stored information and noting the shape of the curve, the optimum voltage for driving the drop generator is determined.

It is worthwhile noting that although three stream characteristics are disclosed, it is within the skill of the art to measure other stream characteristics and use such characteristics to generate control signals to servo-control the drop generator without departing from the scope or spirit of the present invention.

Figure 10:
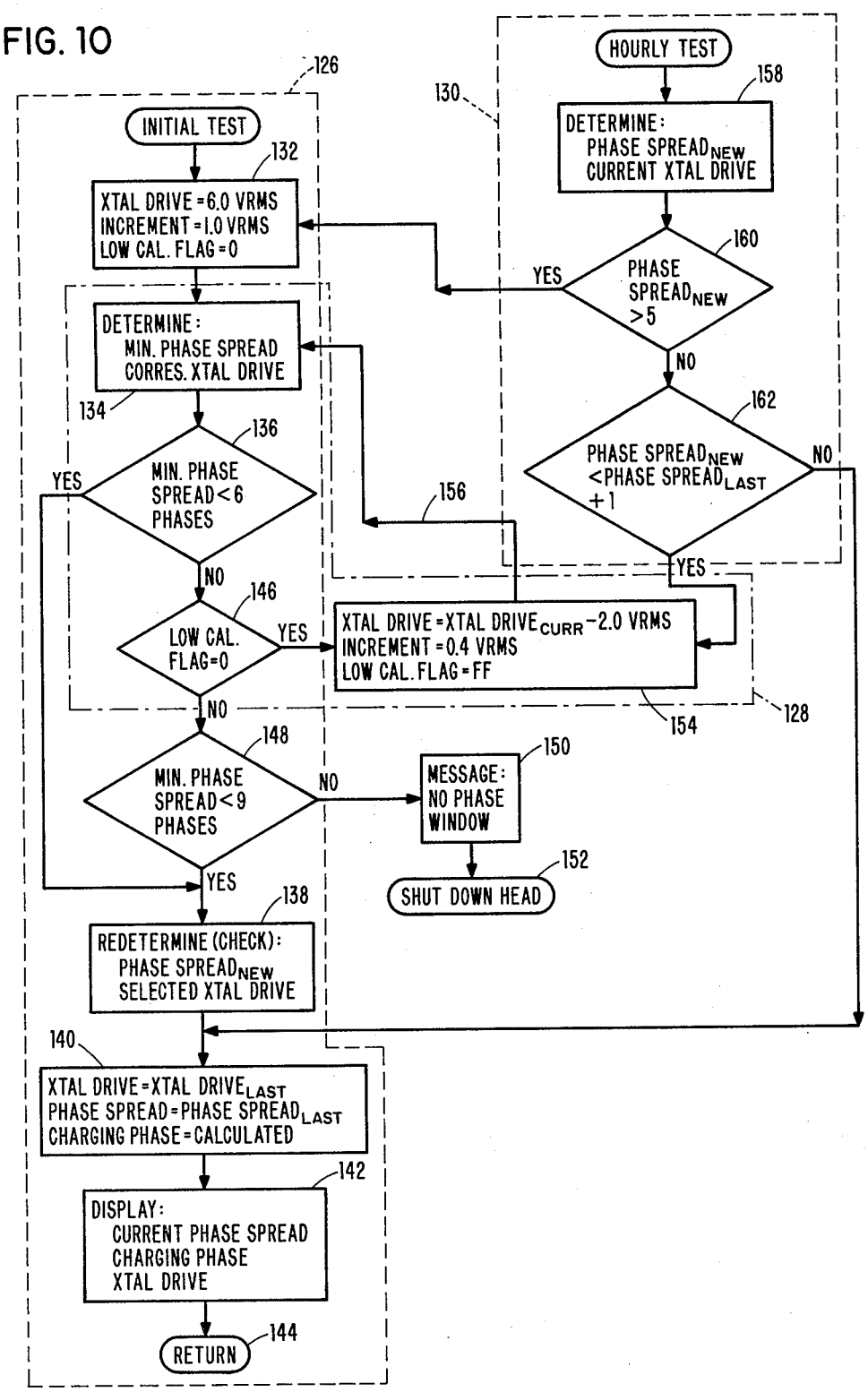
FIG. 10 shows a flowchart of the processing steps for programming the controller of FIG. 3.

The flowchart in FIG. 10 shows a routine for practicing the crystal or drop generator adjust servo method associated with the present invention. The flowchart is sufficient to enable one skilled in the art to program the microcomputer controller to perform the adjustment to establish and maintain the optimum voltage for driving the drop generator.

Essentially, the routine comprises an initial test path 126, a fine adjustment test path 128 and a periodic test path 130. At least the routine must incorporate initial test path 126. Particularly, the initial test path 126 is used to establish the minimum break-off spread and the optimum operating voltage with an increment of say one volt. If the initial test path does not establish the optimum drive voltage, then the fine adjustment test path is utilized with an increment of say 0.4 volt until the optimum operating voltage is determined. The periodic test path is utilized to periodically recheck the head after the optimum voltage has been determined. In the preferred embodiment of this invention, the periodic check was run at a frequency of one hour or less.

The first block in the initial test path 126 is the initial test block. In effect, this is an entry block and indicates that the initial function of turning on the machine is performed. Block 132 shows the initial values at which the system is set up. By way of example, the crystal (XTAL) drive voltage is set at six volts ($V_{rms}$). The increment by which the initial voltage is increased is set equal 1.0 $V_{rms}$. Simultaneously a flag called the low calibration (CAL) flag is set equal to 0. From block 132 the program progresses to block 134. The function of block 134 is to determine the minimum phase spread corresponding to a particular crystal (XTAL) drive. In order to determine the minimum phase spread, a particular voltage is applied to the crystal drive. The break-off phase for each stream in the head is determined using the method previously described. As the break-off phase for each stream is obtained, it is recorded. From the recorded values, the minimum and maximum break-off phase is determined. The break-off phase spread for that specific head is determined by finding the difference between the maximum and minimum break-off phase. Having determined the minimum phase spread, the program then enters decisional block 136. In block 136, if the minimum phase spread is less than a predetermined number of phases (say 6 phases where one drop clock period has been divided into 16 phases) then the program exits the block along the yes-path into test block 138. In test block 138, the program checks to see that the phase spread is correct, the crystal drive is correct, and then exits the block into test block 140. In test block 140, the program sets the crystal drive equal to the last crystal drive that was calculated in block 138. The phase spread is set equal to the phase spread last calculated in test block 138 and the charging phase is calculated. The process for determining charging phase is well known and will not be described and will not be repeated. From test block 140, the program enters test block 142. Test block 142 is in effect, a status block wherein the current phase spread, charging phase and crystal drive values are shown on a display. From the test block 142, the program exits at the return block 144.

Assuming that at decisional block 136, the phase spread was greater than six phases, then the program exits the block along the no-path into decisional block 146. The program then tests to see if the low calibrated flag was set equal to zero. If the flag is not set equal to zero, the program exits the block along the no-path into decisional block 148. In decisional block 148, the program tests to see if the minimum phase spread is less than nine phases. If it is, the program exits the block along the yes path into blocks 138, 140, 142 and 144, respectively. The function which the program performs in each of these blocks has been previously described and will not be repeated. However, if on testing the minimum phase spread in block 148, the program determines that it is greater than nine phases, then the program exits the block along the no-path into message block 150 and shutdown block 152. The message block signifies a display, informing the operator that there is no phase window suitable for charging the droplets. This means that the phase spread between the various break-off points of the streams is greater than a predetermined value, say $\tau/2$ where $\tau$ equals the period of the drop clock. As a result of the wide phase spread, the drop break-off from all streams cannot be charged reliably with synchronous charge electrode voltages for printing. As a result, block 152 indicates that the processor shut down the printing system.

If on testing the low calibrated flag in decision block 146, the program determines that the flag is set to zero, then the program exits the block along the yes-path into operation block 154. In operation block 154 the crystal drive (XTAL DR) is set equal to the current value of the crystal drive minus two volts ($V_{rms}$). The incremental drive voltage is set for 0.4 volts ($V_{rms}$). The low calibrated flag (LOW CAL FLAG) is set equal FF (hex). Once the program sets up these initial conditions, the program exits operational block 154 along path 156 into operational block 134.

To enable optimum operation of the ink jet printing system, periodically the system is tested to see that the crystal drive voltage, the phase spread, etc., are still within an acceptable range. To assure this, the hourly test path is initiated for every hour the system is running. Of course, the test may be run at a greater or lessor frequency than one hour intervals. The first block in the hourly test path is an entry block. In the entry block the program enters the hourly check routine. From the entry block, the program descends into operational block 158. In operational block 158, the program determines the new phase spread. The new phase spread is determined by methods previously described. The test is performed at the current crystal (XTAL) drive. Both the new phase spread and the current crystal drive are recorded. The program then exits into decisional block 160. In decisional block 160, the program tests to see if the new phase spread is greater than five phases. If it is greater than five phases, the program exits the block along the yes-path into operational block 132 where the program progresses to identify the optimum crystal drive voltage in the method previously described. If the new phase spread is less than five phases, then the program exits decisional block 160 along the no-path into decisional block 162. In decisional block 162, the program runs a comparison test to see if the new phase spread is greater than the last phase spread set in block 140 plus one. If the new phase spread is not greater, then the program exits the block along the no-path into block 140 and the drive to the crystal is not adjusted. However, if the new phase spread is greater, then the program exits the block along the yes-path into block 154. In block 154, the program proceeds to fine-tune the crystal drive.

While the invention has been particularly shown and described with reference to a preferred embodiment thereof, it will be understood by those skilled in the art that the foregoing description and/or drawings may be changed therein, without departing from the spirit and scope of the present invention.

What is claimed is:

1. In a multinozzle ink jet printing system wherein streams of ink are generated from a multinozzle head and broken up into individual droplets of ink, and a trajectory characterizing means channels the droplets into a print flight path and a no-print flight path, the improvement comprising:
    an exicitation means associated with the multinozzle head and operable to generate a plurality of droplet streams therefrom;
    a sensing means positioned downstream from the point at which streams are broken up into droplets and operable to sense a characteristic associated with said droplet streams, said characteristic being indicative of the distance from said sensing means to the droplet break-off point in each stream, and to output a first set of signals representative of said characteristic; and
    a controller means operable to process the signals to determine the spread in break-off point distances from stream to stream and responsive to the spread to generate a drive signal for altering the magnitude of the excitation produced by the excitation means so that the spread in the distances at which droplets are detaching from the individual streams is maintained within a minimum range.

2. The multinozzle ink jet printing system of claim 1 wherein the excitation means includes a piezoelectric crystal.

3. The ink jet printing system of claim 1 wherein the sensing means includes an electrical conductor.

4. The multinozzle ink jet printing system recited in claim 2 wherein the controller means comprises:
    a drop sensor electronics means operable to receive the first set of signals and to generate a second set of signals, said second set of signals indicative of a droplet time of flight;
    a controller means operable to receive the second set of signals and to generate voltage adjustment signals; and
    a variable voltage driver means operable to receive the adjustment signals and output controlled voltage for driving the piezoelectric crystal.

5. The multinozzle ink jet printing system of claim 4 wherein the drop sensor electronics means includes an operational amplifier;
    a zero-crossing electrical network operably coupled to the amplifier; and
    a flight time counter, coupled to said zero-crossing electrical network, said flight time counter having an enabling input, a disabling input and an output.

6. The multinozzle ink jet printing system of claim 4 wherein the controller means includes a microcomputer.

7. The multinozzle ink jet printing system of claim 4 wherein the variable voltage driver means includes a multiplying digital-to-analog converter having a reference signal input and a multiplying signal input;
    a capacitor coupled to the output of said multiplying digital-to-analog converter; and
    a power amplifier for amplifying a signal outputted from the capacitor.

8. The multinozzle ink jet printing system of claim 7 further including a signal generating means coupled to the reference signal input, said signal generating means operable to generate signals having a fixed drop clock frequency and a fixed amplitude.

9. An improved multinozzle ink jet system for forming indicia on a support media comprising in combination:
   means for generating a plurality of continuously flowing filaments of ink;
   means for applying disturbances having regular frequency but variable amplitude to said filaments, and causing a series of uniformly sized ink droplets to detach from the filaments;
   a means for selectively charging the droplets;
   a means for influencing the droplets into a print and a no-print path;
   gutter assembly means for catching droplets traversing the no-print path;
   a sensing means operable to output signals representative of the droplet flight time in each stream, said sensing means being positioned transversely to the ink droplet streams between the means for charging the droplets and the gutter assembly means; and
   control means for processing the droplet flight time signals to detect the difference in flight time from stream to stream and outputting a variable voltage signal to said applying means to change the amplitude of the disturbances to the filaments to minimize the difference in flight times so that the range within which droplets are detaching is minimized.

10. A method for operating a multinozzle ink jet printer so that the spread in break-off distance between streams is being minimized, said method comprising the following steps:
   (a) generating a plurality of continuously flowing capillary streams;
   (b) applying a stimulating signal to break up the streams into a series of droplet streams;
   (c) determining the strongest driven stream;
   (d) determining the weakest driven stream;
   (e) determining the relative break-off distance for the strongest driven stream and the weakest driven stream; and
   (f) adjusting the stimulating signals until the break-off distance for the strongest driven stream and the weakest driven stream is substantially identical thereby ensuring that the spread in break-off distance is at a minimum.

11. The method recited in claim 10 wherein steps (c) and (d) are being determined as follows:
   (i) placing an electrical charge on the droplets at the instant of break-off from the capillary streams;
   (ii) sensing the charged droplets at a point downstream from the breakoff;
   (iii) calculating the time elapsing from droplet break-off to droplet sensing;
   (iv) recording the elapsed time;
   (v) repeating steps (i)–(iv) of this claim for each stream;
   (vi) comparing the recorded times to determine the minimum and the maximum; and
   (vii) identifying the stream with the minimum recorded time as the weakest driven stream and the stream with the maximum recorded time as the strongest driven stream.

* * * * *